United States Patent [19]

Ito et al.

[11] 4,329,733
[45] May 11, 1982

[54] CAPACITOR COMBINED SHIELD CASE

[75] Inventors: Katsuo Ito; Bunjiro Murata, both of Kanazawa, Japan

[73] Assignee: Murata Manufacturing Co., Ltd., Japan

[21] Appl. No.: 70,601

[22] Filed: Aug. 29, 1979

[30] Foreign Application Priority Data

Sep. 11, 1978 [JP] Japan .................. 53-125103[U]
Sep. 11, 1978 [JP] Japan .................. 53-125104[U]

[51] Int. Cl.³ ............................................. H01G 4/42
[52] U.S. Cl. ............................................. 361/302
[58] Field of Search .................. 335/172, 182, 185; 361/275, 302

[56] References Cited

U.S. PATENT DOCUMENTS 2,922,936  1/1960  Dehn et al. .................. 361/302
2,973,490  2/1961  Schlicke .................. 361/302 X
3,023,383  2/1962  Schlicke .................. 333/182

Primary Examiner—William M. Shoop
Attorney, Agent, or Firm—Ostrolenk, Faber, Gerb & Soffen

[57] ABSTRACT

A shield case having openings at both ends is fabricated by drawing a blank and the opening at one end of the shield case is formed at the periphery thereof as a flat annular receiving portion, with a portion intermediate the receiving portion and the case side surface curved with a gentle curvature. A capacitor including a doughnut shaped dielectric unit is disposed inside the shield case contiguous to the receiving portion and a metallic cylinder is provided extending through the aperture of the dielectric unit of the capacitor and the one end opening of the shield case. One electrode is formed on one main surface of the doughnut shaped dielectric unit, while the other electrode is formed on the other main surface of the unit and a lead out electrode is also formed around the aperture on the other main surface of the unit electrically isolated from the said other electrode. A resistor film is formed between the other electrode and the lead out electrode, and electrical connection is made between the metallic cylinder and the one electrode, and an electrical connection is also made between the metallic cylinder and the lead out electrode, while these are mechanically fixed.

14 Claims, 19 Drawing Figures

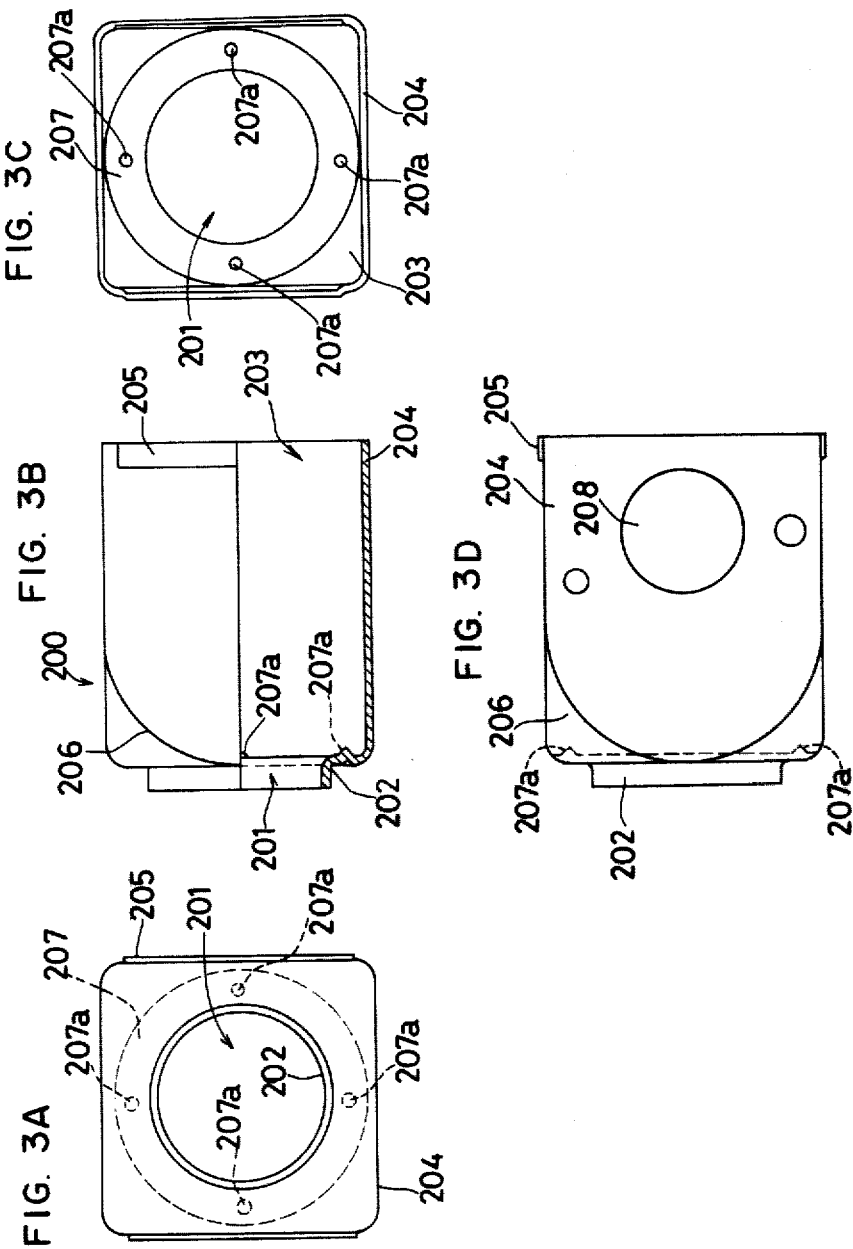

CAPACITOR COMBINED SHIELD CASE

BACKGROUND OF THE INVENTION

1. Field of the Invention

The present invention relates to a capacitor combined shield case. More specifically, the present invention relates to a capacitor combined shield case for use with an antenna terminal board of a television receiver.

2. Description of the Prior Art

In a television receiver, for example, a coaxial cable of 75Ω is utilized to connect an antenna and a tuner circuit. In order to connect such a coaxial cable from an antenna to a tuner, an antenna terminal board is utilized. Such an antenna terminal board is structured to be of a shield type for the purpose of preventing an interference caused by an electric wave and a reflection wave entering through a path other than an antenna.

FIG. 1 is a fragmentary view showing a portion of a conventional antenna terminal board which constitutes the background of the invention. Referring to FIG. 1, a coaxial cable of 75Ω, for example, connected from an antenna, not shown, is connected to a coaxial cable connector receptacle 4, while a coaxial cable being connected to a tuner, not shown, is coupled to a jack 16. The connector receptacle 4 is fixed to an aperture of an insulating substrate 1 by means of a flange 5 provided at the outer surface thereof. The connector receptacle 4 includes a terminal 6 which is connected to a center conductor of a coaxial cable and a connector receptacle 4 which is connected to an outer conductor of the coaxial cable. A feedthrough capacitor is connected to the upper portion of the connector receptacle 4 by means of a nut 13, a lug combined washer 12 and a spring washer 11. The feedthrough capacitor comprises an inner side electrode connecting portion 7, a capacitor unit 8, and an outer side electrode connecting portion 9. The capacitor unit 8 has an inner side electrode 81 formed on the upper surface thereof and an outer side electrode 82 formed on the lower surface thereof. The electrode 81 and the connecting portion 7 are contacted and the electrode 82 and the connecting portion 9 are contacted. Accordingly, the capacitor unit 8 defines a capacitance between the electrode 81 and thus the connecting portion 7 and the electrode 82 and thus the connecting portion 9. The feedthrough capacitor is further filled with a resin material 10 between two connecting portions 7 and 9, i.e. is resin molded. A shield case 2 is provided on the insulating substrate 6 so as to enclose the connector receptacle 4 and the feedthrough capacitor. The above described jack 16 is provided on the side wall of the shield case 2. A shield cover 3 is mounted on the upper end opening of the shield case 2. A composite RC device 15 is connected between the terminal 17 of the jack 16 and the terminal 6 of the connector receptacle 4. A discrete resistor 14 is connected between the lug portion of the above described lug combined washer 12 and the shield case 2. FIG. 2 shows a schematic diagram of the FIG. 1 antenna terminal board. As well known, the composite RC device 15 is provided for the purpose of lightning arresting and to that end the composite RC device 15 is provided with a discharge gap 15G. A capacitance C of the feedthrough capacitor and a resistance R of the resistor 14 are connected in parallel. Since the detail of such a circuit configuration of the antenna terminal board is well known to those skilled in the art, a detailed description thereof will be omitted.

As seen from FIG. 1, a conventional antenna terminal board comprises the outer side electrode connecting portion 9 of a feedthrough capacitor and a shield case 2 which are structured by separate components and necessitates a step of connecting the electrode connecting portion 9 and the shield case 2 by some process in assemblying the same. Accordingly, extra components and assembling steps are required, increasing the cost of the terminal board. Furthermore, since an aimed connection is achieved through the spring washer 11, a disadvantage was encountered that an electrical contact is liable to be poor. In addition, the resistor 14 is also prepared as a discrete component and is connected in place during assembly. Therefore, the number of discrete resistors is increased and accordingly the number of connecting steps is increased.

SUMMARY OF THE INVENTION

A capacitor combined shield case in accordance with the present invention basically comprises a shield case made of an electrically conductive material having at least two openings, a capacitor being housed in the shield case and having a doughnut shaped dielectric unit, a feedthrough conductor being inserted through the aperture of the doughnut shaped dielectric unit and one of the openings of the shield case, and a shield cover made of an electrically conductive material for covering the other opening of the shield case. The shield case includes a generally flat and substantially annular capacitor fixing portion in the vicinity of one opening thereof and the capacitor having a doughnut shaped dielectric unit is placed thereon and fixed thereto. The feedthrough conductor includes a flange portion at the end thereof being positioned at the inside of the case, so that the capacitor is sandwiched between the flange portion and the fixing portion.

In a preferred embodiment of the present invention, the capacitor includes one electrode on one main surface of the doughnut shaped dielectric unit and another electrode on the other main surface of the dielectric unit. The capacitor further includes a lead out electrode around the aperture of the dielectric unit on the other main surface, with a resistor component connected between the lead out electrode and the other electrode. The one electrode and the feedthrough conductor are connected by said flange portion, while the lead out electrode and the feedthrough conductor are connected.

According to a preferred embodiment of the present invention, a capacitor combined shield case is provided wherein the number of components is considerably decreased and the number of assembling steps is accordingly decreased. Therefore, such a shield case is provided with a very inexpensive cost as compared with that of a conventional shield case. A capacitor including a doughnut shaped dielectric unit and a shield case are directly connected in an electrical manner and fixed in a mechanical manner, so that reliable contact is achieved. Furthermore, an impedance value in terms of a high frequency by virtue of a stray capacitance and the like decreases, so that a shielding effect of an inherent function as a shield case is fully performed. Since in a preferred embodiment a resistor component is formed integrally with a capacitor, a discrete resistor component can be dispenced with, thereby eliminating the necessity of a corresponding assembling step.

In a further preferred embodiment of the present invention, a fixing portion of a shield case, i.e. a surface in contact with a doughnut shaped dielectric unit, is provided with a plurality of protrusions. As a result, an ample amount of an electrically conductive material, such as solder is interposed between the unit and thus the capacitor and the shield case. The solder and the like interposed between the dielectric unit and the shield case serves to absorb the stress exerted by virtue of their different coefficients of expansion, thereby effectively preventing the occurrence cracks of and the like in the dielectic unit.

Accordingly, a principal object of the present invention is to provide an improved capacitor combined shield case.

Another object of the present invention is to provide a capacitor combined shield case which is inexpensive, wherein the number of components is deceased and accordingly the number of assembling steps is decreased.

A further object of the present invention is to provide a capacitor combined shield case, which exhibits improved and stable shielding.

Still a further object of the present invention is to provide a shield case combined with an improved capacitor.

These objects and other objects, features, aspects and advantages of the present invention will become more apparent from the following detailed description of the invention when taken in conjunction with the accompanying drawings.

BRIEF DESCRIPTION OF THE DRAWINGS

FIG. 3A is a left side view of an example of a shield case for use in the present invention;

FIG. 3B shows a front view, partially in section, of the FIG. 3A shield case;

FIG. 3C is a left side view of the FIG. 3A shield case;

FIG. 3D is a bottom view of the FIG. 3A shield case;

DESCRIPTION OF THE PREFERRED EMBODIMENTS

Figure 1:
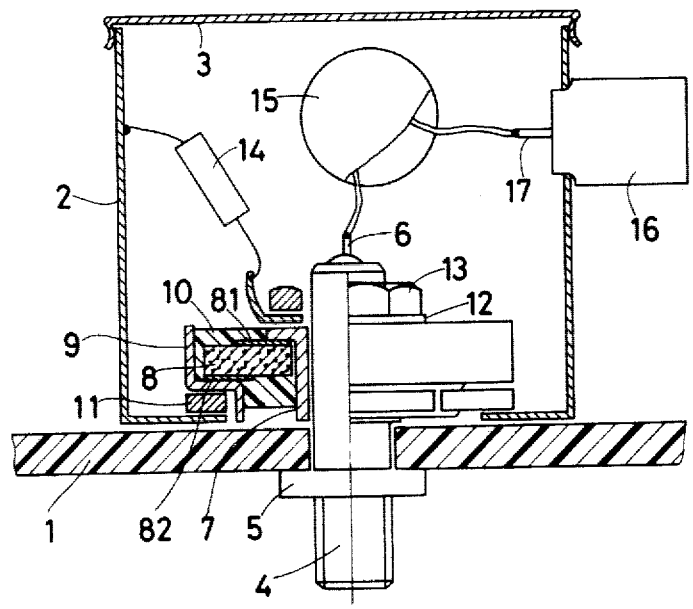
FIG. 1 is a fragmentary view showing a shield case portion for use with a conventional antenna terminal board wherein the present invention can be advantageously employed.

FIGS. 3A, 3B, 3C and 3D show a left side view, a front view, partially in section, a right side view, and a bottom view, respectively, of a shield case 200 for use in the present invention. The shield case 200 is fabricated by drawing a blank of iron, for example. The case 200 is rectangular in shape and includes openings 201 and 203 at respective ends. The case 200 is further structured such that the opening 201 is defined by a raised edge 202 formed such that the edge of the case 200 is curved outward. The opening 203 is defined by the edge of the side surface 204 of the case 200. A rib 205 is formed around the edge of the opening 203 and is used for fixing a shield cover to be described subsequently. The shield case 200 further includes a flat and annular capacitor receiving portion 207 at the end thereof where the opening 201 is formed. The capacitor receiving portion 207 serves to receive an abutting arrangement of a capacitor, not shown in FIGS. 3A, 3B, 3C and 3D, including a doughnut shaped dielectric unit, to be described subsequently. The receiving portion 207 is formed with a plurality of protrusions 207a, 207a, . . . on the surface where the capacitor is to be disposed in abutment thereagainst. An area connecting the capacitor receiving portion 207 and the side surface 204 is formed as a rounded portion 206 having a gentle curvature for facility of the drawing work of the case 200. A fixing aperture 208 is formed in one side surface 204 for fixing a coaxial cable connector receptacle to be described subsequently.

Figure 2:
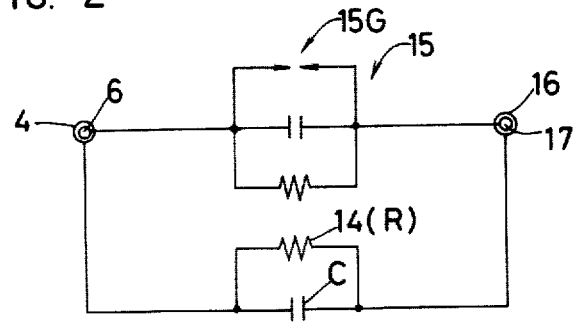
FIG. 2 is a schematic diagram showing an electrical connection of various components included in such antenna terminal board.
Figure 4A:
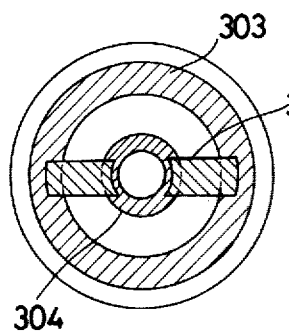
FIG. 4A is a left side view of a feedthrough type RC device including a doughnut shaped dielectric unit for use in the present invention.
Figure 4B:
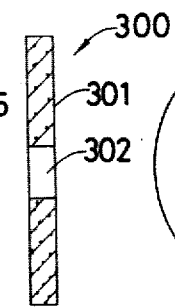
FIG. 4B is a front sectional view of the dielectric unit.
Figure 4C:
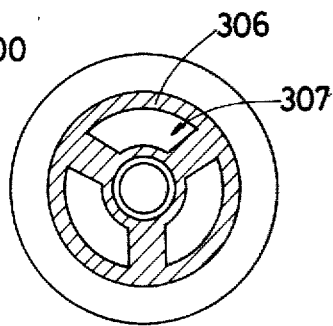
FIG. 4C is a right side view of the dielectric unit.

FIGS. 4A, 4B and 4C are a left side view, a front view, partially in section, and a right side view, respectively, of a feedthrough type RC device including a doughnut shaped dielectric unit for use in the present invention. The feedthrough type RC device 300 corresponds to an RC parallel circuit shown in FIG. 2. A dielectric unit 301 is made of ceramic, for example, and is formed in a flat doughnut shape. An aperture 302 is formed in the unit 301 and is adapted to receive a connecting member or a feedthrough conductor 101, described below. Electrodes 303 and 304 are separately and concentrically formed on one main surface of the unit 301. The electrode 303 and the electrode 304 (serving as a lead out electrode) are connected by a resistor member 305 corresponding to the resistor 14 in FIG. 1 and thus the resistor R in FIG. 2. The resistor member 305 as well as the electrodes 303 and 304 may be formed by printing, for example. A third electrode 306 is further formed on the other main surface of dielectric unit 301. Portions 307 of electrode 306 have been removed as necessary to the extent of not affecting an electrical performance. Formation of the removed portion 307 makes it possible to save electrode material. Insofar as a mechanical strength permits, the removed portion of the electrode 306 may be made larger.

Figure 5:
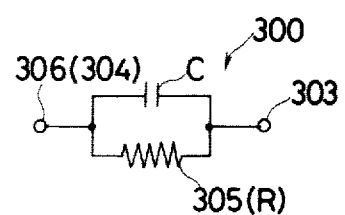
FIG. 5 is a schematic diagram of the FIG. 4 feedthrough type RC device.

FIG. 5 shows a schematic diagram of feedthrough type RC device 300. More specifically, the device 300 comprises a capacitance C formed by the electrodes 303, 304 and 306 and the dielectric unit 301 interposed between these electrodes 303 and 304 and 306, and a resistance R formed by the resistor member 305. As to be described subsequently, the electrodes 304 and 306 are electrically connected by means of a solder, for example, provided through an inner wall of the aperture 302 of the dielectric unit 301, so as to function as substantially a single electrode.

Figure 6A:
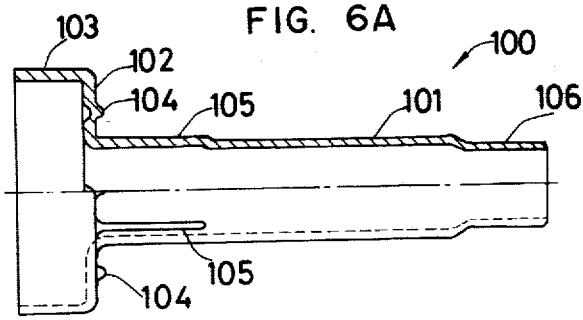
FIG. 6A is a front view, partially in section, of an example of a feedthrough conductor for use in the present invention.
Figure 6B:
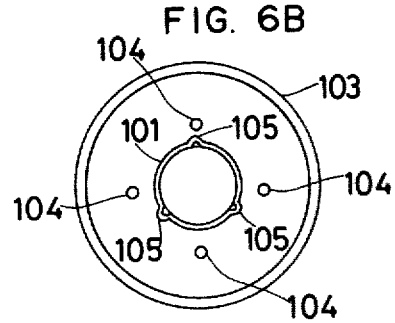
FIG. 6B is a left side view of the FIG. 6A feedthrough conductor.
Figure 6C:
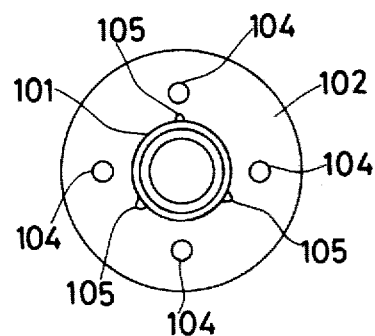
FIG. 6C is a right side view of the FIG. 6A feedthrough conductor.

FIGS. 6A, 6B and 6C show a front view, partially in section, a left side view, and a right side view, respectively, of an example of a feedthrough conductor for use in the present invention. The feedthrough conductor 100 is structured in a cylinder to form a cylindrical portion 101. A flange portion 102 is formed at one end of the cylindrical portion 101 and is adapted to contact electrode 306 (FIG. 4) formed on the above described dielectric unit 301 when dielectric unit 301 is placed in operational engagement with conductor 100. The flange portion 102 includes a raised portion 103 at the periphery thereof. The feedthrough conductor 206 shown in FIGS. 6A, 6B and 6C includes the following features. A plurality of protrusions 104 are formed on the upper surface of the flange 102 and are adapted to be contacted by the electrode 306 of the feedthrough type RC device 300 when dielectric unit 301 is placed in operational engagement with conductor 100. A plurality of ribs 105 are formed on the cylindrical portion 101 and are selected to be longer than the thickness of the dielectric unit 301 at the least. The other end 106 of the cylindrical portion 101 is selected to be smaller in the diameter than the cylindrical portion 101 such that the other end portion 106 may be approximately equal to the outer diameter of an inner insulation of a coaxial cable, not shown, being inserted thereto.

Figure 7:
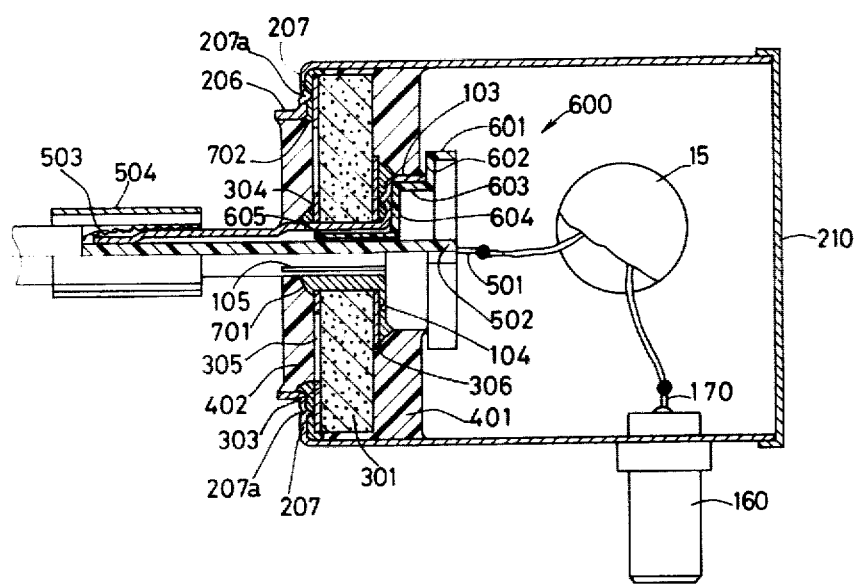
FIG. 7 is a sectional view of an example of a capacitor combined shield case as assembled using various components shown in FIGS. 3A, 3B, 3C, 3D, 4A, 4B. 4C, 6A, 6B and 6C.

FIG. 7 is a sectional view showing a portion of an antenna terminal board of one embodiment of the present invention. As seen from the FIG. 7, the capacitor combined shield case of the embodiment shown comprises the shield case 200 shown in FIGS. 3A, 3B, 3C and 3D, the feedthrough type RC device 300 shown in FIGS. 4A, 4B and 4C and the feedthrough conductor 100 shown in FIGS. 6A, 6B and 6C. At the outset, a ring shaped solder, not shown, is placed on the capacitor receiving portion 207 of the shield case 200 and then the feedthrough type RC device 300 is placed thereon such that the electrode 303 of the dielectric unit 301 faces the receiving portion 207. As a result, the electrode 306 of the feedthrough type RC device 300 faces the shield cover 210. Another ring shaped solder, not shown, having a diameter smaller than that of the ring shaped solder interposed between the above described receiving portion 207 and the device 300 is placed on the electrode 306 of the device 300 at the position against which the flange portion 102 of the feedthrough conductor 100 abuts. The feedthrough conductor 100 is inserted through both the aperture 302 of the feedthrough RC device 300 (and thus through the dielectric unit 301) and the opening 201 of the shield case 200. When the feedthrough conductor 100 is inserted into the central aperture 302 of the dielectric unit 301 in the direction shown in FIG. 7, the cylindrical portion 101 is positioned properly with respect to the central aperture 302 (that is, aligned with the center line) as a result of the plurality of ribs 105 formed on the cylindrical portion 101 of the feedthrough conductor 100.

Thus the shield case 200, the ring shaped solder, not shown, the device 300, the other ring shaped solder, not shown, and the feedthrough conductor 100 are positioned. Thereafter, the assembly is placed in an electric furnace which has been raised to an elevated temperature sufficient to melt the ring shaped solders. When the ring shaped solder located between electrode 306 and the flange 102 melts, a solder connection 701 is formed between electrode 306 and flange 102. The solder connection 701 also extends from the electrode 306 of the device 300, through a gap formed between the cylindrical portion 101 and the central aperture 302 (the gap being caused by the rib 105) to the opposite side of dielectric unit 301 (i.e. the side on which electrode 304 is located). As a result, solder connection 701 connects the electrodes 304 and 306 and also connects these electrodes to the cylindrical portion 101 and the flange portion 102 of the feedthrough conductor 100 in both an electrical and mechanical manner. When the ring shaped solder located between electrode 303 and receiving portion 207 melts, it forms a solder connection 702 between these elements.

The gap caused between the inner surface of the central aperture 302 and the outer surface of the cylindrical portion 101 by ribs 105 facilitates the flow of molten solder between electrodes 306 and 304, thereby easily short circuiting the electrodes 304 and 306. A gap is also formed between the surface of the electrode 306 and the surface of the flange portion 102 by the plurality of protrusions 104 formed on the flange portion 102. Therefore, an air between the cylindrical portion 101 and the central aperture 302 readily escapes through this gap thereby facilitating the flow of a molten solder.

It should be clear from the foregoing that the formation of a plurality of ribs 105 on the cylindrical portion 101 of the feedthrough conductor and the formation of a plurality of protrusions 104 on the flange portion 102 ensure that the electrodes of the feedthrough type RC device 300 and the feedthrough conductor are soldered. Accordingly, the solder connection 701 is uniformly formed and uneven formation of an inductance at such portion is prevented.

As best seen in FIG. 3, the fixing portion 207 of the shield case is formed of a plurality of protrusions 207a. Accordingly, an ample spacing is provided between the fixing portion 207 and the electrode 303 and thus the unit 301. Therefore, an ample solder connection 207 is formed at this location. The solder connection 702 interposed between the shield case 200 (and thus the fixing portion 207) and the electrode 303 (and thus the electric unit 301) performs the following functions. The shield case 200 is made of metal, for example, while the dielectric unit 301 is made of ceramic, for example. Accordingly, the coefficient of thermal expansion of these materials are largely different, and, when the shield case is rapidly heated or cooled as in case of a heat shock test, expansion or contraction of one material is considerably larger than that of the other material. Therefore, without an ample amount of the solder in the above described solder connection 702, the stress of the shield case by virtue of the above described difference of the thermal expansion coefficients is transmitted directly to the dielectric unit 301, which could cause a crack in the dielectric unit 301. However, according to the embodiment shown, an ample amount of solder exists in the solder connection 702. As well known, solder is soft compared with the shield case and the dielectric unit. Accordingly, the above described stress exerted to both is fully absorbed by the solder, thereby preventing the formation of a crack in the dielectric unit 301.

After the shield case 200, the feedthrough type RC device 300, and the feedthrough conductor 100 are electrically connected and mechanically fixed in the foregoing manner, a resin layer 401 is formed inside the shield case 200 at the portion defined by the side surface 204, the device 300 and the raised portion 103 of the feedthrough conductor 100. At the same time, a resin layer 402 is formed at the portion defined by the raised portion 206 of the shield case 200, the cylindrical portion 101 of the feedthrough conductor 100 and the device 300.

A cap 600 made of resin, for example, is fitted to the flange portion 102 (and thus the raised portion 103) of the feedthrough conductor 100. The cap 600 includes a small diameter portion 603 having an outer diameter approximately equal to the the inner diameter of the raised portion 103 of the feedthrough conductor 100 and a large diameter portion 601 having an outer diameter larger than the raised portion 103. The large diameter portion 601 and the small diameter portion 603 by a connecting portion 602. The cap 600 further includes a flat portion 604 extending from the end of the small diameter portion 603 and having a central aperture and a cylindrical portion 605 extending from the inner periphery of the central aperture of the flat portion. The small diameter portion 603 of the cap 600 is fitted into the raised portion 103 of the feedthrough conductor 100, so that the upper end edge of the raised portion 103 abuts against the connnecting portion 602. The flat portion 604 of the cap 600 is placed in contact with the flange portion 102 (FIG. 6A) of the feedthrough conductor 100. The cylindrical portion 605 of the cap 600 is inserted into the cylindrical portion 101 of the feedthrough conductor 100. The inner insulation 502 of a coaxial cable described below is inserted through both the cylindrical portion 605 of the cap and the cylindrical portion 101 of the feedthrough conductor 100. The cap 600 serves to prevent a cap combined RC composite device 15 from being adhered to an unnecessary portion such as the raised portion 103 of the feedthrough conductor 100 in soldering the cap combined RC composite device 15 to the center conductor 501 of the coaxial cable.

The inner insulation 502 of the coaxial cable is inserted into the cylindrical portion 101 of the feedthrough conductor 100 and the tip end of the center conductor 501 (enclosed with the inner conductor 502) is brought to the shield case 200 and is soldered to the cap combined RC composite device, as described previously. An outer conductor 503 of the coaxial cable is placed in contact with the outer surface of the cylindrical portion 101, whereupon the same is fastened by means of a fastening member 504.

A coaxial cable connecter receptacle 160 is then fixed to the aperture 206 (see FIG. 3D) of the side surface 204 of the shield case 200. A coaxial cable (not shown) is connected to the coaxial cable connector receptacle 160 and its center conductor is electrically connected to the terminal 170. The terminal 170 is connected to one of the above described cap combined RC composite device 15. The other opening of the shield case 200 is covered with a shield cover 210. A rib 205 (see FIG. 3B) formed on side surface 204 prevents shield cover 210 from slipping off.

The antenna terminal board thus obtained is provided such that the coaxial cable of 75Ω connected from the antenna is connected to the connector receptacle 105 and the inner insulation 502 of the coaxial cable to a tuner circuit of a television receiver is inserted into the feedthrough conductor 100 while the center conductor 501 and the outer conductor 503 are connected to the corresponding portions.

Figure 8A:
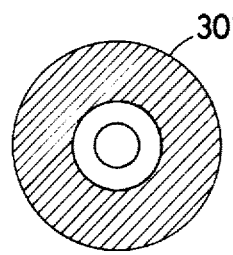
FIG. 8A is a left side view of another example of a feedthrough type RC device for use in the present invention.
Figure 8B:
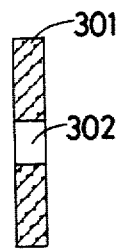
FIG. 8B is a front sectional view of a doughnut shaped dielectric unit of the FIG. 8A device.
Figure 8C:
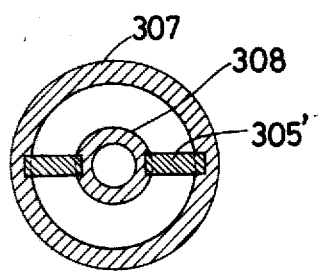
FIG. 8C is a right side view of the doughnut shaped dielectric unit of the FIG. 8A device.

FIGS. 8A and 8B, 8C are a left side view, a front sectional view, and a right side view of another example of a feedthrough type RC device 300 for use in the present invention. An electrode 307 is formed on substantially the whole surface of one main surface, excluding a peripheral portion of a throughgoing aperture 302, of a doughnut shaped dielectric unit 301 and another electrode 307 is formed extending along the side surface of the unit 301 to the end edge of the main surface of the opposite side. A further electrode 308 is formed on the other main surface, separated from the electrode 307 and inside the same. The electrode 308 corresponds to the inner side electrode shown in FIG. 1 and the electrode 307 corresponds to the outer side electrode shown in FIG. 1. A printed resistor member 305' is formed between the electrodes 307 and 308. Since the resistor component is thus printed on the dielectric unit 301, a discrete resistor can be dispensed with.

Figure 9:
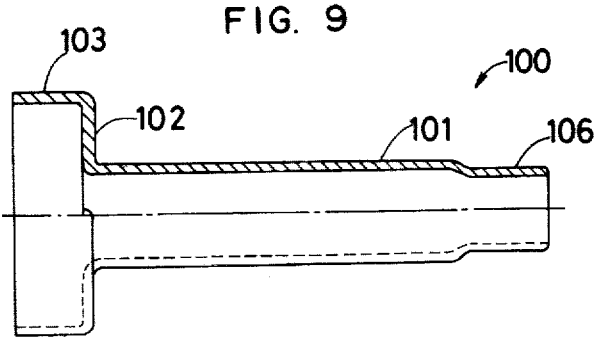
FIG. 9 is a front view, partially in section, of another example of a feedthrough conductor for use in the present invention.

FIG. 9 is a side view, partially in section, of another example of a feedthrough conductor 100 for use in the present invention. In the example shown a plurality of protrusions 104 and a plurality of ribs 105 shown in FIG. 6 have been omitted. Accordingly, it is possible that the solder portion 701 shown in FIG. 7 might be uneven, as compared with a case shown in FIG. 6. More specifically, since the feedthrough conductor 100 shown in FIG. 6 is formed of the ribs 105, an ample amount of solder is filled between the inner surface of the throughgoing aperture 302 of the doughnut shaped dielectric unit 301 and the outer surface of the cylindrical portion 101 of the feedthrough conductor 100. Without such ribs 105, it is possible that an ample amount of solder does not fill the solder portion 701.

Figure 10:
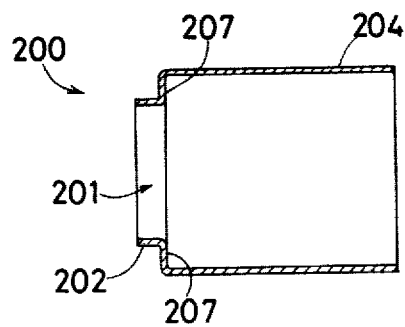
FIG. 10 is a sectional view of another example of a shield case for use in the present invention.

FIG. 10 is a sectional view of another example of a shield case for use in the present invention. In the shield case of the embodiment shown, a plurality of protrusions 207a, 207a, . . . shown in FIG. 3 have been omitted. Accordingly, there might be a fear that the solder portion 702 shown in FIG. 7 might be uneven or thinner as compared with a case shown in FIG. 7.

Although the present invention has been described and illustrated in detail, it is clearly understood that the same is by way of illustration and example only and is not to be taken by way of limitation, the spirit and scope of the present invention being limited only by the terms and the appended claims.

What is claimed is:

1. A capacitor combined shield case, comprising:
   (A) a capacitive component including:
   (1) a doughnut shaped dielectric unit having first and second opposed faces and a central aperture formed therein;
   (2) first and second electrodes formed on said first and second opposite faces, respectively, of said dielectric unit; and
   (3) a feedthrough conductor inserted through said aperture in said dielectric unit, said feedthrough conductor having a flange portion in contact with said first electrode and a raised portion located at the outer periphery of said flange portion and extending away from said dielectric unit;

(B) a cylindrical shield case made of electrically conductive material and having first and second openings formed therein, the portion of said case surrounding said first opening defining a fixing portion, said second opening being sufficiently large to permit said dielectric unit to be placed in said case;

(C) said capacitive component being located in said case with said second electrode in contact with said fixing portion and said dielectric unit being sandwiched between said flange portion and said fixing portion;

(D) a first resin layer located in said case along said first face of said dielectric unit; and (E) a shield cover made of an electrically conductive material covering said second opening in said shield case.

2. A capacitor combined shield case, comprising:

(A) a capacitive component including:
  (1) a doughnut shaped dielectric unit having first and second opposed faces and a central aperture formed therein;
  (2) first and second electrodes formed on said first and second opposite faces, respectively, of said dielectric unit; and
  (3) a feedthrough conductor inserted through said aperture in said dielectric unit, said feedthrough conductor having a flange portion in contact with said first electrode;

(B) a cylindrical shield case made of electrically conductive material and having first and second openings formed therein, the portion of said case surrounding said first opening defining a fixing portion, said second opening being sufficiently large to permit said dielectric unit to be placed in said case;

(C) said capacitive component being located in said case with said second electrode in contact with said fixing portion and said dielectric unit being sandwiched between said flange portion and said fixing portion;

(D) a first resin layer located in said case along said first face of said dielectric unit;

(E) a shield cover made of an electrically conductive material covering said second opening in said shield case; and (F) a second resin layer formed at said first opening in said shield case and covering said second surface of said doughnut shaped dielectric unit which would otherwise be exposed by said opening.

3. A capacitor combined shield case in accordance with claim 2, wherein:

said shield case further includes a raised portion extending axially outwardly from the inner periphery of said one opening of said shield case; and said second resin layer is located in an area defined by said raised portion of said shield case, said second surface of said doughnut shaped dielectric unit and an outer surface of said feedthrough conductor.

4. A capacitor combined shield case, comprising:

(A) a capacitive component including:
  (1) a doughnut shaped dielectric unit having first and second opposed faces and a central aperture formed therein;
  (2) first and second electrodes formed on said first and second opposite faces, respectively, of said dielectric unit; and
  (3) a feedthrough conductor inserted through said aperture in said dielectric unit, said feedthrough conductor having a flange portion in contact with said first electrode;

(B) a cylindrical shield case made of electrically conductive material and having first and second openings formed therein, the portion of said case surrounding said first opening defining a fixing portion, said second opening being sufficiently large to permit said dielectric unit to be placed in said case;

(C) said capacitive component being located in said case with said electrode in contact with said fixing portion and said dielectric unit being sandwiched between said flange portion and said fixing portion;

(D) a first resin layer located in said case along said first face of said dielectric unit;

(E) a shield cover made of an electrically conductive material covering said second opening in said shield case; and (F) said feedthrough conductor having a cylindrical shape which allows a coaxial cable including a central conductor, an inner insulation covering said central conductor, and and outer conductor outside said inner insulation to be fixed thereto, said inner insulation of said coaxial cable being inserted into a cavity of said cylindrical feedthrough conductor such that said inner conductor of said coaxial cable is electrically insulated from said feedthrough conductor and extends into said shield case, said outer conductor of said coaxial cable being electrically connected to said cylindrical feedthrough conductor.

5. A capacitor combined shield case, comprising:

(A) a capacitive component including:
  (1) a doughnut shaped dielectric unit having first and second opposed faces and a central aperture formed therein;
  (2) first and second electrodes formed on said first and second opposite faces, respectively, of said dielectric unit, a lead out electrode formed on said second face of said dielectric unit in spaced relation with said second electrode; and
  (3) a feedthrough conductor inserted through said aperture in said dielectric unit, said feedthrough conductor having a flange portion in contact with said first electrode;

(B) a cylindrical shield case made of electrically conductive material and having first and second openings formed therein, the portion of said case surrounding said first opening defining a fixing portion, said second opening being sufficiently large to permit said dielectric unit to be placed in said case;

(C) said capacitive component being located in said case with said second electrode in contact with said fixing portion and said dielectric unit being sandwiched between said flange portion and said fixing portion;

(D) a first resin layer located in said case along said first face of said dielectric unit;

(E) a shield cover made of an electrically conductive material covering said second opening in said shield case; and (F) a film resistor member formed on said doughnut shaped electric unit and electrically connecting said second electrode to said lead out electrode.

6. A capacitor combined shield case in accordance with claim 5, wherein:

said lead out electrode is formed on said second face of said doughnut shaped dielectric unit around the outer periphery of said aperture; and said feedthrough conductor and said first electrode are electrically connected and said feedthrough conductor and said lead out electrode are electrically connected.

7. A capacitor combined shield case in accordance with claim 6, wherein said first electrode is electrically connected to said feedthrough conductor at said flange portion of said feedthrough conductor.

8. A capacitor combined shield case, comprising:
(A) a capacitive component including:
  (1) a doughnut shaped dielectric unit having first and second opposed faces and a central aperture formed therein;
  (2) first and second electrodes formed on said first and second opposite faces, respectively, of said dielectric unit; and
  (3) a feedthrough conductor inserted through said aperture in said dielectric unit, said feedthrough conductor having a flange portion in contact with said first electrode;
(B) a cylindrical shield case made of electrically conductive material and having first and second openings formed therein, the portion of said case surrounding said first opening defining a fixing portion, said second opening being sufficiently large to permit said dielectric unit to be placed in said case;
(C) said capacitive component being located in said case with said second electrode in contact with said fixing portion and said dielectric unit being sandwiched between said flange portion and said fixing portion;
(D) a first resin layer located in said case along said first face of said dielectric unit;
(E) a shield cover made of an electrically conductive material covering said second opening in said shield case; and
(F) said shield case including a plurality of protrusions at said fixing portion protruding toward and in contact with said second electrode and serving to space said second electrode from said fixing portion.

9. A capacitor combined shield case, comprising:
a rectangular shield case formed by drawing of a metallic plate and having first and second openings at respective opposite ends, said shield case including a flat, annular receiving portion at the periphery of said first opening, a portion of said intermediate said receiving portion and a side surface of said case being curved, said end of said shield case having said second opening being rectangular in shape;
a capacitor disposed in abutment against said receiving portion of said shield case and including a doughnut shaped dielectric unit, and at least two electrodes formed on said dielectric unit;
a metallic cylinder inserted through both an aperture formed in said doughnut shaped dielectric unit and said first end opening of said shield case;
a shield cover made of an electrically conductive material and covering said second opening of said shield case; and
one electrode of said capacitor being connected and fixed to said receiving portion of said shield case, the other electrode of said capacitor being connected and fixed to said metallic cylinder.

10. A capacitor combined shield case in accordance with claim 9, wherein said shield case includes a raised portion protruding axially outward from the outer periphery of said first end opening of said shield case, and further including a resin material filling an area defined by said raised portion and a portion of said one electrode within said shield case.

11. A capacitor combined shield case in accordance with claim 10, wherein said metallic cylinder includes:
a flange portion in physical and electrical contact with said other electrode of said capacitor; and
a raised portion formed at the periphery of said flange portion, a second resin material filling an area defined by said raised portion of said metallic cylinder and the inner wall of said shield case.

12. A capacitor combined shield case in accordance with claim 9, wherein said shield case includes a plurality of protrusions at said fixing portion protruding toward and in contact with said capacitor fixed thereto.

13. A capacitor combined shield case in accordance with claim 9, wherein:
said one electrode is formed on one main surface of said doughnut shaped dielectric unit;
a lead out electrode is formed on a second main surface of said doughnut shaped dielectric unit and surrounds said aperture;
said other electrode is formed on said second main surface of said doughnut shaped dielectric unit and is spaced from said lead out electrode; and
said metallic cylinder and said one electrode are electrically connected and said metallic cylinder and said lead out electrode are electrically connected.

14. A capacitor combined shield case in accordance with claim 13, wherein:
said metallic cylinder includes a flange portion which contacts said one main surface of said doughnut shaped dielectric unit; and
said one electrode is electrically connected to said metallic cylinder at said flange portion of said metallic cylinder.

* * * * *